United States Patent
Barrus (10) Patent No.: US 6,192,480 B1
(45) Date of Patent: *Feb. 20, 2001

(54) METHOD OF MANAGING POWER FOR A COMPUTER SYSTEM AND GENERATING APPLICATION THRESHOLD WARNINGS

(75) Inventor: Jeff Barrus, Emmet, ID (US)

(73) Assignee: Micron Electronics, Inc., Nampa, ID (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/896,411

(22) Filed: Jul. 18, 1997

(51) Int. Cl.[7] .................................................. G06F 1/32
(52) U.S. Cl. ................................................................ 713/320
(58) Field of Search .................................... 713/300, 320, 713/322, 323, 330, 340

(56) References Cited

U.S. PATENT DOCUMENTS

| | | |
|---|---|---|
| 5,167,024 | 11/1992 | Smith et al. . |
| 5,230,074 | 7/1993 | Canova, Jr. et al. . |
| 5,345,392 | 9/1994 | Mito et al. . |
| 5,469,553 | 11/1995 | Patrick . |
| 5,481,733 | 1/1996 | Douglis et al. . |
| 5,493,670 * | 2/1996 | Douglis et al. ........................ 395/750 |
| 5,560,022 | 9/1996 | Dunstan et al. . |
| 5,613,135 | 3/1997 | Sakai et al. . |
| 5,630,148 * | 5/1997 | Norris ................................. 395/750 |
| 5,682,273 * | 10/1997 | Hetzler .................................. 360/75 |
| 5,692,204 | 11/1997 | Rawson et al. . |
| 5,694,607 * | 12/1997 | Dunstan et al. ....................... 395/750 |
| 5,760,636 * | 6/1998 | Noble et al. ........................... 327/513 |

* cited by examiner

*Primary Examiner*—David A. Wiley
(74) *Attorney, Agent, or Firm*—Knobbe, Martens, Olson & Bear, LLP (57) ABSTRACT

Disclosed is a method relating to implementation of a power management utility. The method relates to adjusting the hardware performance settings of particular hardware devices on a computer in order to extend the charge of an attached computer battery. As the user adjusts the hardware settings, the computer notifies the user whether the performance of any software applications loaded on the computer would be adversely affected by the hardware settings. In a preferred embodiment, the computer automatically detects all software applications on the computer and inputs the minimum operating requirements for each application into a data structure. As the user manipulates the hardware power settings, the computer accesses the data structure and compares it to the power settings. The computer then notifies the user if the power settings are set below desired levels for any of the applications on the computer.

22 Claims, 6 Drawing Sheets

METHOD OF MANAGING POWER FOR A COMPUTER SYSTEM AND GENERATING APPLICATION THRESHOLD WARNINGS

BACKGROUND OF THE INVENTION

1. Field of the Invention

The present invention relates to a power management application for a computer. More particularly, the present invention relates to a computer power management utility that assists a user in adjusting computer hardware performance levels to increase the life of an attached battery and ensure that software applications run at desired performance levels.

2. Description of the Related Art

Notebook computers are typically powered by batteries that are removably connected to the computer. The charged life of a computer battery typically ranges from one hour to several hours. A computer battery usually has an interface that can be plugged into an electrical outlet, allowing a user to re-charge the battery after the battery charge is spent. It is highly desirable to maximize the battery's charged life in order to increase the amount of time that the computer may be operated without a recharge and to reduce the number of times a user is required to recharge the battery.

The hardware devices on the computer directly affect the charged life of a battery. If a battery is required to power a greater number of hardware devices on the computer, the battery charge is consumed at a higher rate, resulting in a reduced charged life. Furthermore, the higher the performance settings of the particular hardware devices, the greater the demands on the battery so that the battery charge is consumed quickly. Factors such as maximum allowable display brightness, CPU processor speed, and hard drive access speeds all affect the rate at which battery power is consumed. Hence, if all hardware devices on the computer are performing at maximum levels, the battery charge is consumed faster than if the hardware is performing at relatively reduced levels.

Consequently, many battery-powered computers include a power management utility program that allows the user to manually adjust and set the performance levels of various hardware devices on the computer in order to maximize the computer battery life. For instance, a power management utility program may allow the user to reduce the computer processor speed so that the processor uses less power, thereby extending the charged life of the battery. Maximum display brightness and hard disk spin down time are examples of other hardware settings that may be adjusted in a typical power management utility.

Unfortunately, the computer user pays a price for extending the charge time of the battery. While reducing the performance levels of the various hardware devices on a computer will maximize battery life, it is done at the cost of reducing the performance of software application programs that are run on the computer. Many software applications require minimum levels of hardware performance. In particular, many software applications may run too slowly or may not even run at all if the hardware performance is set below a certain level.

In many instances, a user may not be bothered if the performance of a software application is reduced. For instance, if a user is simply reviewing a text or data file in a wordprocessing program, the user may not require high speed performance out of the processor and may simply desire to maximize the battery life. The user may not mind if the application does not perform at its maximum level, as extending battery life is the main concern. In other instances, such as when playing computer games, the user may place a higher emphasis on the performance of the software rather than on extending the battery life. In any event, the user of a battery-powered computer usually desires to set the hardware such that software performance and battery life are both optimized.

Unfortunately, current power management utility programs do not offer a user a way of assessing the impact of the hardware power settings on software performance. Consequently, when using a power management utility, the user is often reduced to guessing whether the current power settings will adversely impact the performance of software applications on the computer. The user may set the hardware performance levels too high for the particular software that will be used so that battery life is not optimized. This is an inefficient use of the battery and shortens the available life of the battery. Alternatively, the user may set the hardware performance levels too low so that when the user attempts to run an application program, the application runs poorly. The user is then required to exit the application, run the power management utility again, and raise the hardware performance settings. This process is very inefficient.

Hence, there is a need for a computer system that incorporates a power management utility program or process that assists a user in optimizing the hardware performance settings to maximize both battery life and software performance. Preferably, the utility will dynamically notify the user, as the user is adjusting the power settings, whether the performance of any applications loaded on the computer will be adversely affected by the current settings. This will allow the user to tailor the hardware settings to his or her particular requirements.

SUMMARY OF THE INVENTION

The aforementioned needs are satisfied by the present invention which is a computer that is configured to allow a user to adjust performance parameters of one or more hardware devices on the computer in order to vary the rate at which power from a limited power supply is consumed. The computer also compares the user selected performance parameters for the hardware devices to the desired performance parameters for the same hardware devices for one or more application programs of the computer and provides a warning to notify the user whether the selected performance parameters will adversely affect the performance of an application program of the computer.

In one embodiment, the computer implements a utility or process that includes a graphical interface that allows a user to manually increase or decrease the performance parameters of the hardware devices while simultaneously providing the user with an indication of the remaining life of the battery at the current hardware settings. As the user adjusts the performance parameters, the computer monitors the impact of the settings on application performance. If the performance of a software application will be adversely affected by the settings, the computer displays a warning flag notifying the user which software application is affected. The warnings advantageously assist the user in selecting the optimal rate of power consumption for the user's intended use of the computer.

When the computer of this embodiment is implementing the power management utility, the computer interfaces with a database that contains the desired performance parameters of the hardware devices for all of the application programs that are loaded onto the computer. As a user adjusts the performance parameters for the hardware devices, the computer compares the selected performance parameters to the desired performance parameters for each application program and triggers a warning flag if the user sets the hardware settings below the desired performance parameters for any application. In one embodiment, a user may manually adjust the desired performance parameters database for each application in order to modify when a warning flag is triggered and to include warning flags for custom applications.

In another embodiment, the computer implements a utility or process that determines which, if any, computer applications are running. If any applications are running, the computer interfaces with the database that contains the desired performance parameters of the hardware devices corresponding to the application that is running. The computer then sets the actual performance parameters to the values of the desired performance parameters of the running application. If multiple applications are running, the computer sets the actual performance parameters to the values of the maximum performance parameters of all of the running programs.

From the foregoing, it will be appreciated that the computer incorporating such a power management utility process assists a user in selecting hardware performance settings to optimize battery life and also monitor whether the settings are sufficient to run software applications with desired effectiveness. This removes the guesswork associated with computers incorporating prior power management utilities where the user desires to adjust hardware power settings to reduce battery power consumption but does not wish to impair the performance of selected software applications. These and other features of the present invention will become more fully apparent from the following description and appended claims taken in conjunction with the accompanying drawings.

DETAILED DESCRIPTION OF THE INVENTION

Figure 1:
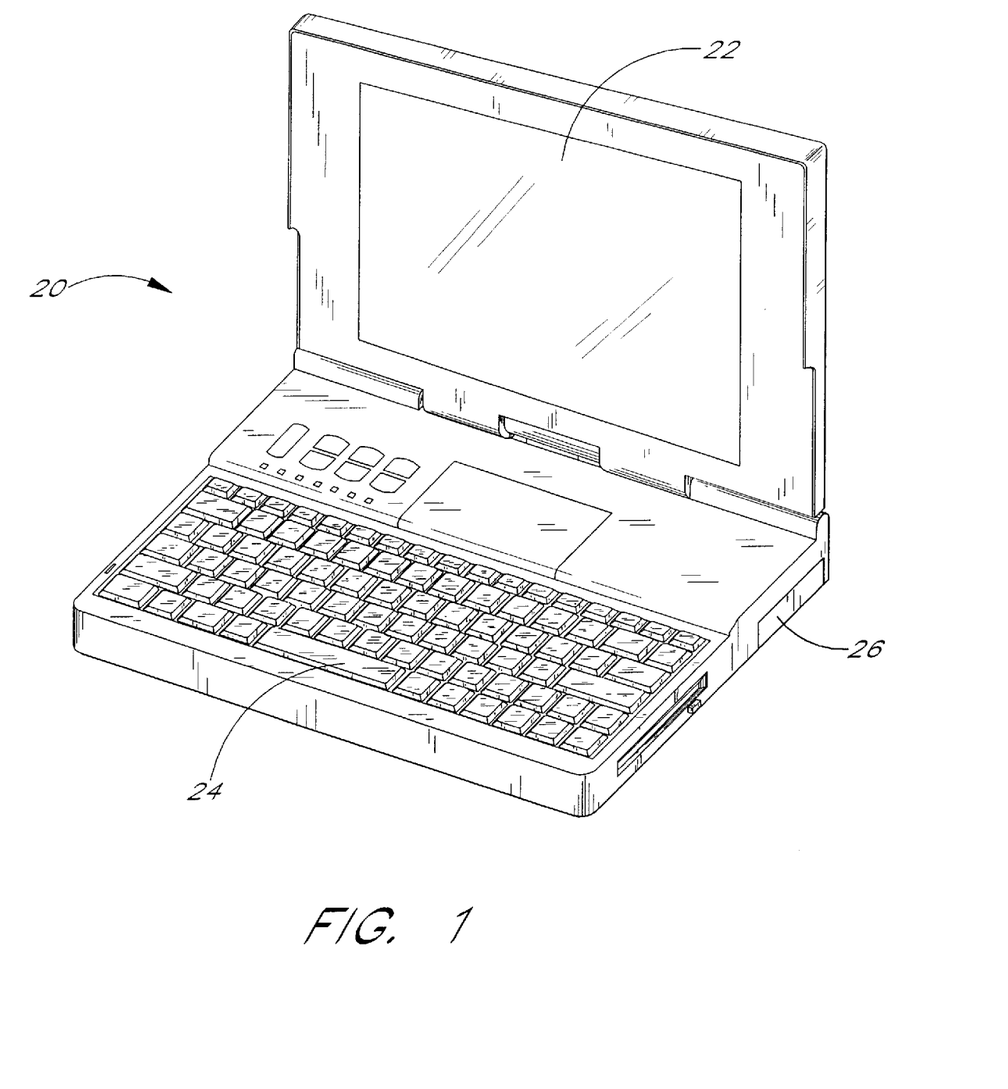
FIG. 1 is a perspective view of a notebook computer.

Reference will now be made to the drawings wherein like numerals refer to like parts throughout. FIG. 1 illustrates one embodiment of a battery-powered notebook computer 20 which incorporates an embodiment of a power management utility process. The notebook computer 20 includes a display 22 for displaying alphanumeric, graphic or other information. The computer 20 further includes an input device, such as a standard keyboard 24. A mouse, touchpad or other such input device (not shown) may also be attached to the computer 20 to allow the user to interface with the computer 20 by manipulating a pointer on the display 22, in a well known manner.

At least one battery 26 is removably mounted to the notebook computer 20 for supplying electrical power to the computer 20. The battery 26 may be any type of standard prior art rechargeable computer battery. The battery 26 includes an interface (not shown) which may be connected to a standard AC electrical outlet using a charge cord (not shown). A user may charge the battery 26 by connecting the battery 26 to an electrical outlet.

Figure 2:
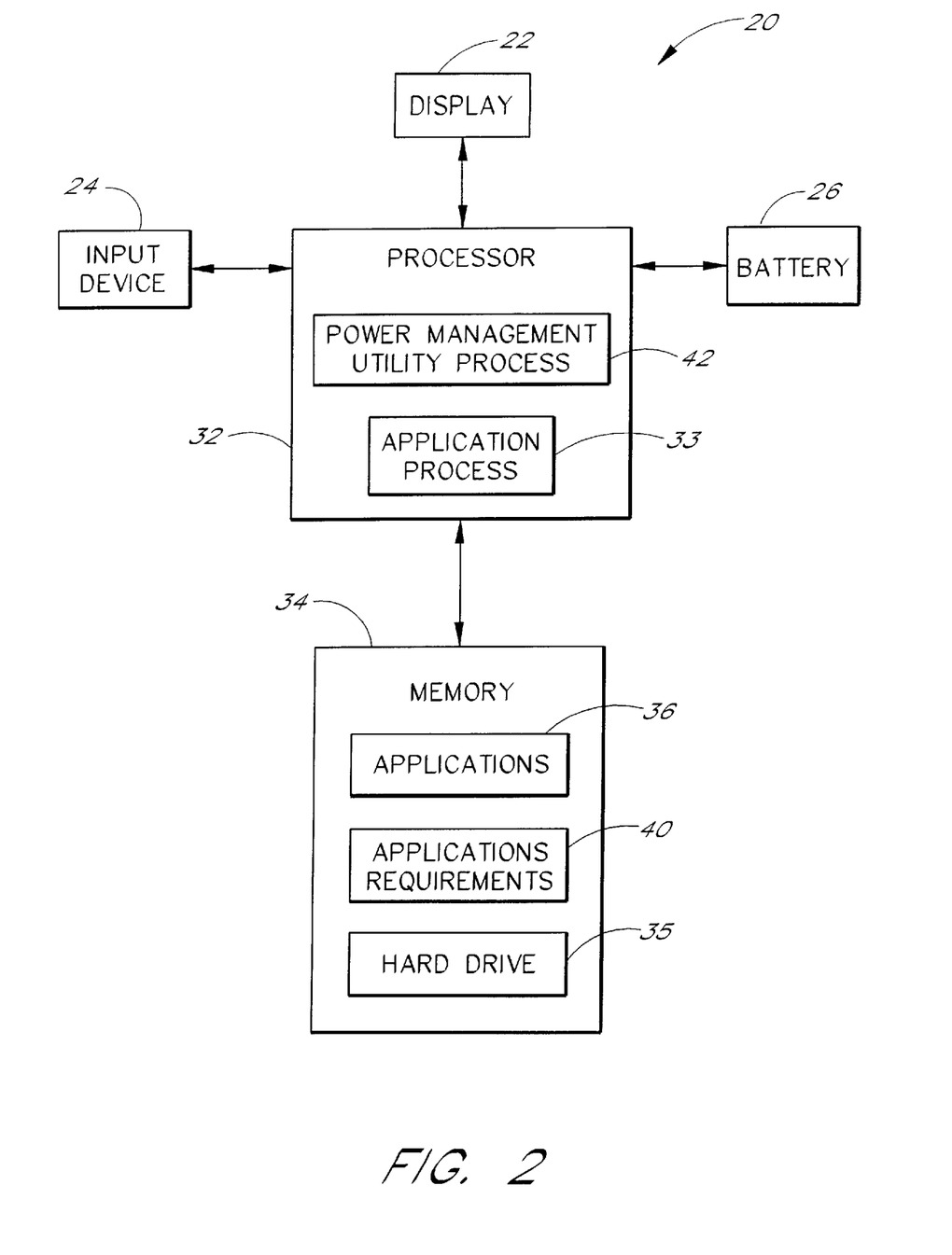
FIG. 2 is a block diagram of one embodiment of a computer incorporating a power control utility process illustrating the functional and logical organization thereof.

FIG. 2 is a simplified functional and structural block diagram of the computer 20 which is configured to perform a power management utility process 42 in accordance with the principles of the present invention. One embodiment of a power management utility process that may be used with the invention is described hereafter with reference to FIG. 4.

The notebook computer 20 preferably includes a central processor 32 that is capable of sending and receiving multiple inputs to and from various hardware and software components of the computer 20. As shown in FIG. 2, the processor 32 interfaces with the computer display 22. Further, the processor 32 accesses and interfaces with a memory 34, in a manner that is well known to those skilled in the art, and performs instruction sets stored therein. The processor 32 may write and read information to and from the memory 34, respectively. The memory 34 may be any type of computer memory known to those skilled in the art, and program instruction sets and data are stored within random access memory (RAM) or read only memory (ROM) or in a hard drive memory 35 in a well known manner.

The processor 32 may be any type of computer processor known to those skilled in the art, such as an Intel Pentium™ processor for an IBM compatible personal computer. An operating system is loaded onto the processor 32 for controlling and monitoring the operation of the computer 20. Any type of computer operating system known to those skilled in the art may be used. In one embodiment, a power management utility process 42 performed by the processor 32 is implemented as part of a standard Microsoft™ Window™-based operating system.

Specifically, the processor 32 is configured to selectively perform the power management process 42. For example, the process 42 can be initiated by the user in a Windows™ environment by the user selecting an appropriate icon displayed on the display 22 by manipulation of the input device 24. This induces the processor 32 to initiate the process 42 that is described in greater detail in reference to the flow chart of FIG. 4.

Referring to FIG. 2, any number of computer software applications 36 are loaded onto the computer 20. The processor 32 is logically organized to include an applications process 33 which implements applications programs that are selected by the user. In one embodiment, the application programs are selected in the Windows™ environment by the user manipulating the user input device to select an icon corresponding to the applications program. The applications 36 may include any of a wide variety of computer software applications, such as a word processor, a database manager, a computer game, etc. The organization of the computer 20 is similar to the organization of well known prior art PC computers that are incorporating DOS or Window™-based operating systems.

Referring to FIG. 2, an applications requirement data structure 40 resides in the memory 34. The applications requirements data structure 40 contains the desired hardware performance parameters for each software application. Specifically, the data structure 40 includes the desired hardware performance parameters that enable each of the applications on the computer to run at a desired level. Such parameters include the required CPU speed, the required hard disk access time, the required display brightness, etc. For example, a computer game may require that the CPU be set to a minimum speed in order for the game to operate correctly or optimally. Alternatively, a word processing program may require a certain display brightness in order for characters to appear on the display 22 with a desired degree of clarity.

In one embodiment, the desired performance parameters for a plurality of well known application programs are initially provided to the data structure 40 upon installation of the power management function in the computer 20. Alternatively, the applications requirements data structure 40 may be created in any wide variety of manners. For instance, the processor 32 may create or update the data structure 40 during power-up, where the processor 32 would search the memory 34 for all software applications and determine the associated desired hardware parameters for each application. The processor 32 would then write the requirements into the data structure 40. A user may also manually create or revise the applications requirements data structure 40 by opening the file and manually changing the settings in a well known manner. This would allow the user to modify the structure 40 to suit particular needs, such as for custom applications.

The processor 32 interfaces with the battery 26 in order to monitor the power remaining in the battery 26. The power management utility process 42 enables the processor 32 to regulate a number of battery-drain parameters for the battery 26. The battery-drain parameters correspond to the actual hardware performance parameters and are the factors which affect the rate at which electrical charge is drained from the battery 26 as a user operates the computer 20. Specifically, the power supplied to various hardware components, such as the hard drive, the display, etc., affect the consumption of the battery's power. Hence, by setting the actual performance parameters in a manner that is known in the art, the overall battery consumption can be controlled. Some examples of battery-drain parameters are the display brightness for the computer display 22, the speed at which the processor 32 is operating, and the amount of time it takes for the hard drive 35 to spin down after each use.

It will be appreciated that the configuration illustrated in FIG. 2 is merely illustrative of one embodiment of the computer system of the present invention. Any of a wide number of additional elements known to those skilled in the art may be included. For instance, additional hardware devices, such as a CD-ROM drive or a sound card, may also be included in the computer configuration.

Figure 3A:
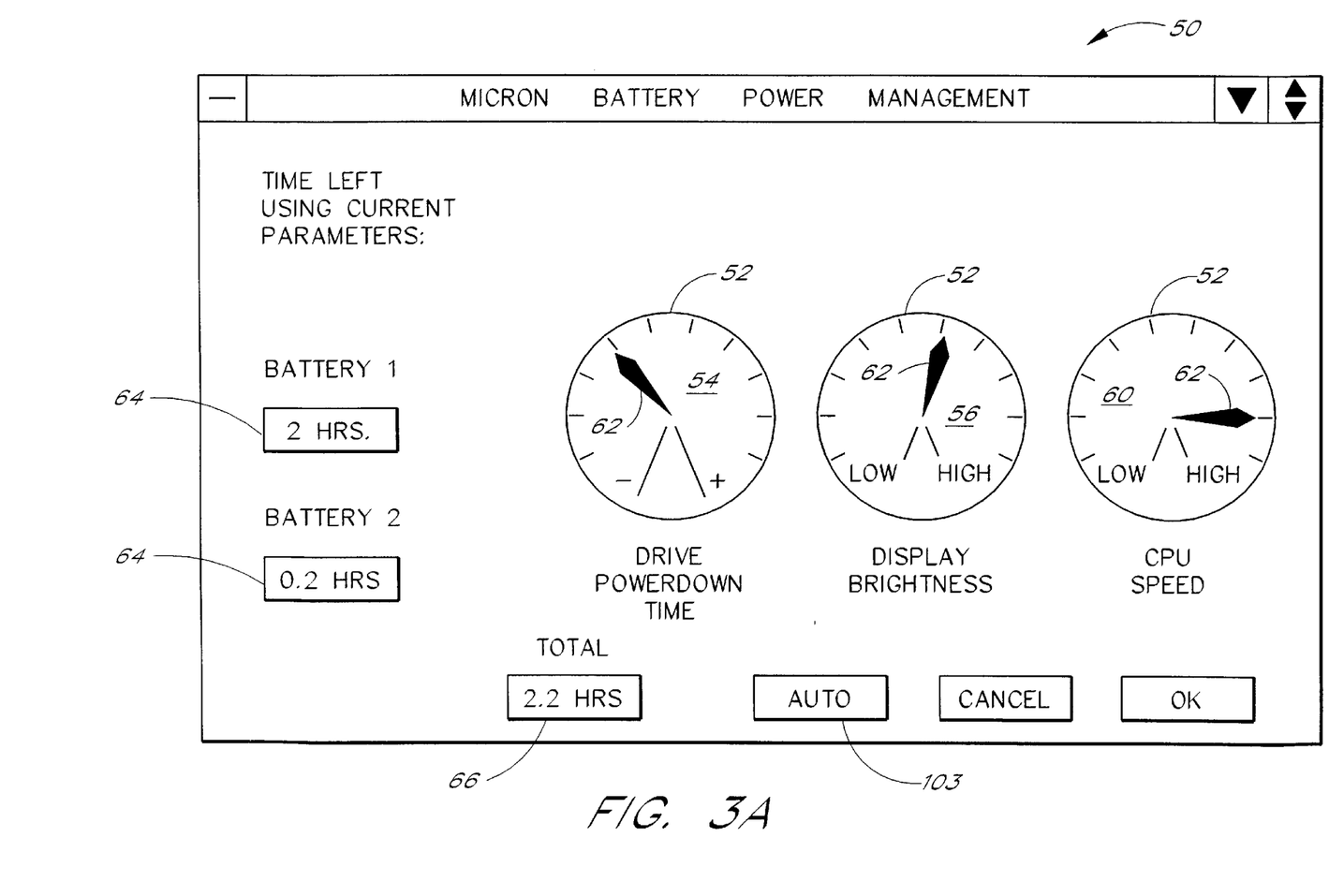
FIG. 3A illustrates one embodiment of a visual interface that is utilized by the computer system of FIG. 2.

FIG. 3A illustrates a visual interface 50 that is implemented by the processor 32 on the display 22 as part of the power management utility process 42. The visual interface 50 acts as an interface by which a user may adjust actual hardware power parameters to thereby manage the drain time of the battery 26. In the embodiment shown, the visual interface 50 includes a plurality of dials 52 which graphically illustrate the current performance settings or parameters of various hardware devices. Each dial 52 has a corresponding hand 62 that points to the current power setting of a hardware device. As described below, a user may adjust the hardware performance settings by manipulating the hands 62 using a mouse pointer, a keyboard stroke, or other input device.

In the embodiment shown, the visual interface 50 includes a hard drive powerdown-time dial 54, a display brightness dial 56 and a CPU speed dial 60. The hand 62 on each dial indicates the actual or current hardware performance level setting of the corresponding hardware device. In this embodiment, the position of the hand 62 is rotatably adjustable in a clockwise or counterclockwise direction, corresponding to a high or low performance setting, respectively. The user may adjust the position of the hand 62 by positioning a mouse pointer (not shown) over the hand 62, depressing the mouse button, and sliding the pointer to move the position of the hand 62. If the hand 62 is rotated closer to the "high" or "+" position on a dial 52, the performance level of the corresponding hardware device is increased, which also increases the rate at which the battery is drained. Likewise, the performance level of a hardware device is decreased if the hand 62 is rotated toward the "low" or "−" position, which will also decrease the rate at which the hardware consumes battery power.

Using the CPU speed dial 60 as an example, if the hand 62 is rotated towards the "high" position on the dial, then the maximum allowable CPU speed, i.e., processor speed, for the computer 20 is increased. Likewise, if the hand 62 is rotated toward the "low" position on the dial 60, then the maximum allowable CPU speed is decreased. In this manner, a user may adjust the performance levels of the various hardware devices on the computer 20 to desired settings. It will be appreciated that although the visual interface 50 illustrates three dials 52 and three corresponding hardware parameters, various other hardware parameters may also be incorporated into the visual interface 50 without departing from the scope of the invention. Furthermore, the visual interface 50 need not utilize dials to illustrate the hardware settings. Any wide variety of other performance indicators, such as a bar graph, may also be used. Alternatively, the hardware performance settings may be indicated using a numerical figure corresponding to the performance level.

As discussed, the actual hardware performance parameters of the various hardware components directly affect the energy drain on the computer battery 26. If a hardware device is set to perform at a high level, then the charge on the battery 26 will drain at a faster rate. The remaining life of the battery or batteries 26 is thus directly affected by the settings on the hardware dials 52. The visual interface 50 therefore includes battery time indicators 64 for indicating the amount of charged-time left for the batteries 26 at the current hardware settings. In the illustrated embodiment, the visual interface 50 includes two time indicators 64, corresponding to two batteries 26 of the computer 20. Additionally, a total time indicator 66 is also included for indicating the combined amount of time remaining for all of the batteries 26 on the computer 20. It will be appreciated, that the visual interface 50 may be revised to include any number of time indicators 64 corresponding to the number of batteries 26 on the computer.

Figure 3B:
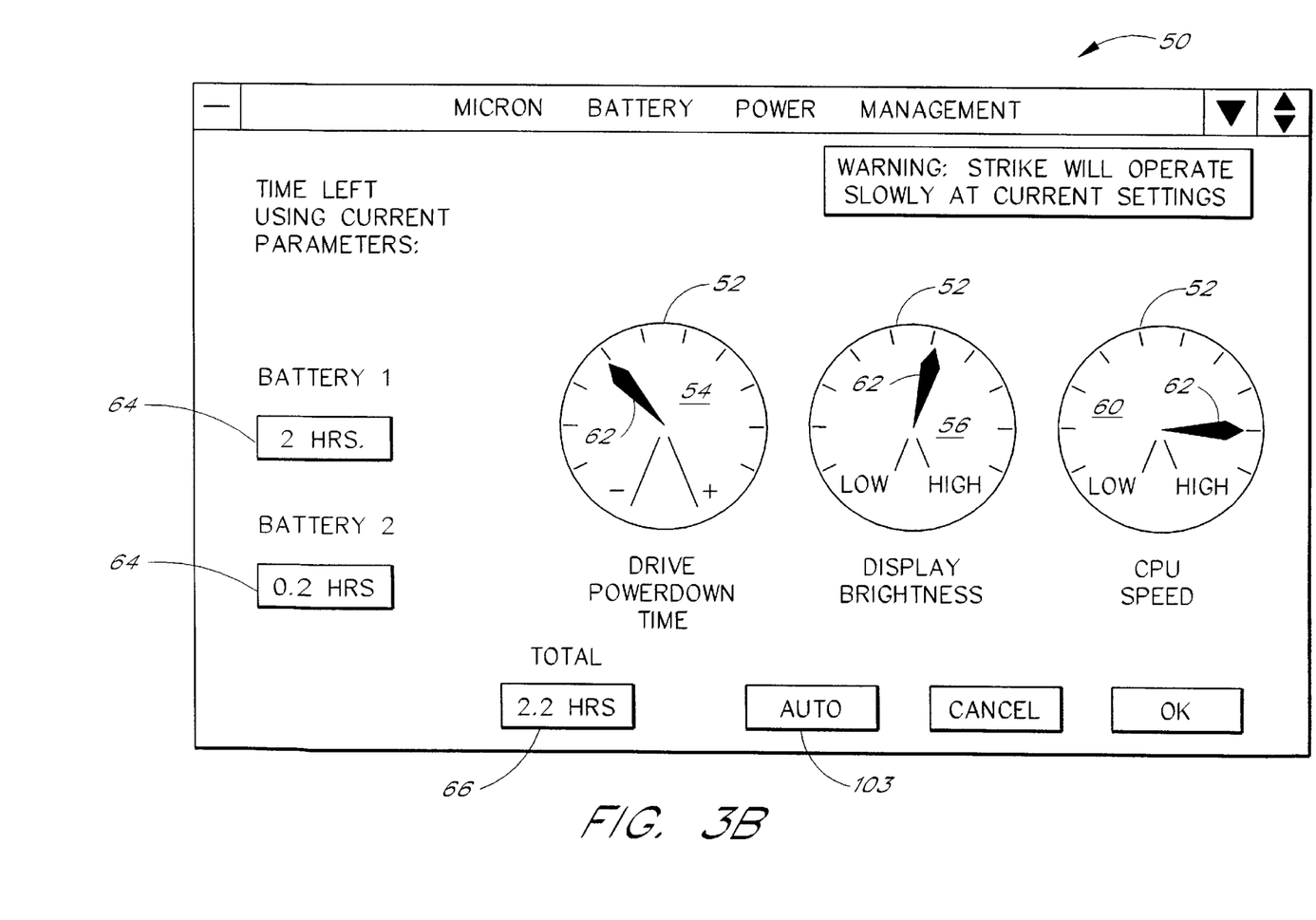
FIG. 3B illustrates another embodiment of the visual interface of FIG. 3A with a warning flag being displayed.

Referring to FIG. 3B, the power management utility process 42 is configured to notify the user whether the current hardware settings will adversely affect the performance of any of the software applications on the computer 20. Preferably, this is accomplished dynamically as the user adjusts any of the hands 62 on any of the dials 52. If a user sets a hand 62 below the desired operating requirements of any of the software applications, the processor 32 when implementing the power management utility process 42 induces the display 22 to display a warning flag 70 indicating the name of the particular application that will not run correctly at the current settings.

For instance, referring to FIG. 3B, for a hypothetical computer game named "Strike", assume that the user desires to reduce the CPU speed using dial 60 in order to increase the battery life. If the user sets the CPU speed below the desired CPU speed for the game "Strike", a warning flag 70 appears containing language that notifies the user that "Strike" will not operate or will operate slowly at the current CPU speed setting. The warning flag 70 may appear anywhere on the computer display 22. Furthermore, the warning flag 70 is not limited to the embodiment shown in FIG. 3B. Any type of indicator, visual or aural, that notifies the user of the reduced software performance will suffice.

The user may acknowledge the warning flag 70 such as, for example, by clicking on the flag 70 with the mouse pointer or by re-adjusting the hardware parameter settings using the dials 52. Once acknowledged, the warning flag 70 disappears from the display 22. The user may choose to ignore the warning flag 70 and remain with the current settings, or raise the hardware performance parameter setting to optimize performance of a particular software application at the cost of greater battery drain. In any event, the warning flags 70 advantageously provide the user with a way of tailoring the hardware performance to his or her particular needs. If maximizing battery life, rather than the performance of a particular software application, is the overriding concern, then the user may choose to ignore a warning flag 70. If software performance of a particular application is the main concern, then the user may raise the performance parameter settings of various hardware devices at the cost of reducing battery life. Either way, the user does not have to guess whether the current hardware performance parameter settings will adversely affect the performance of any software applications.

Figure 4:
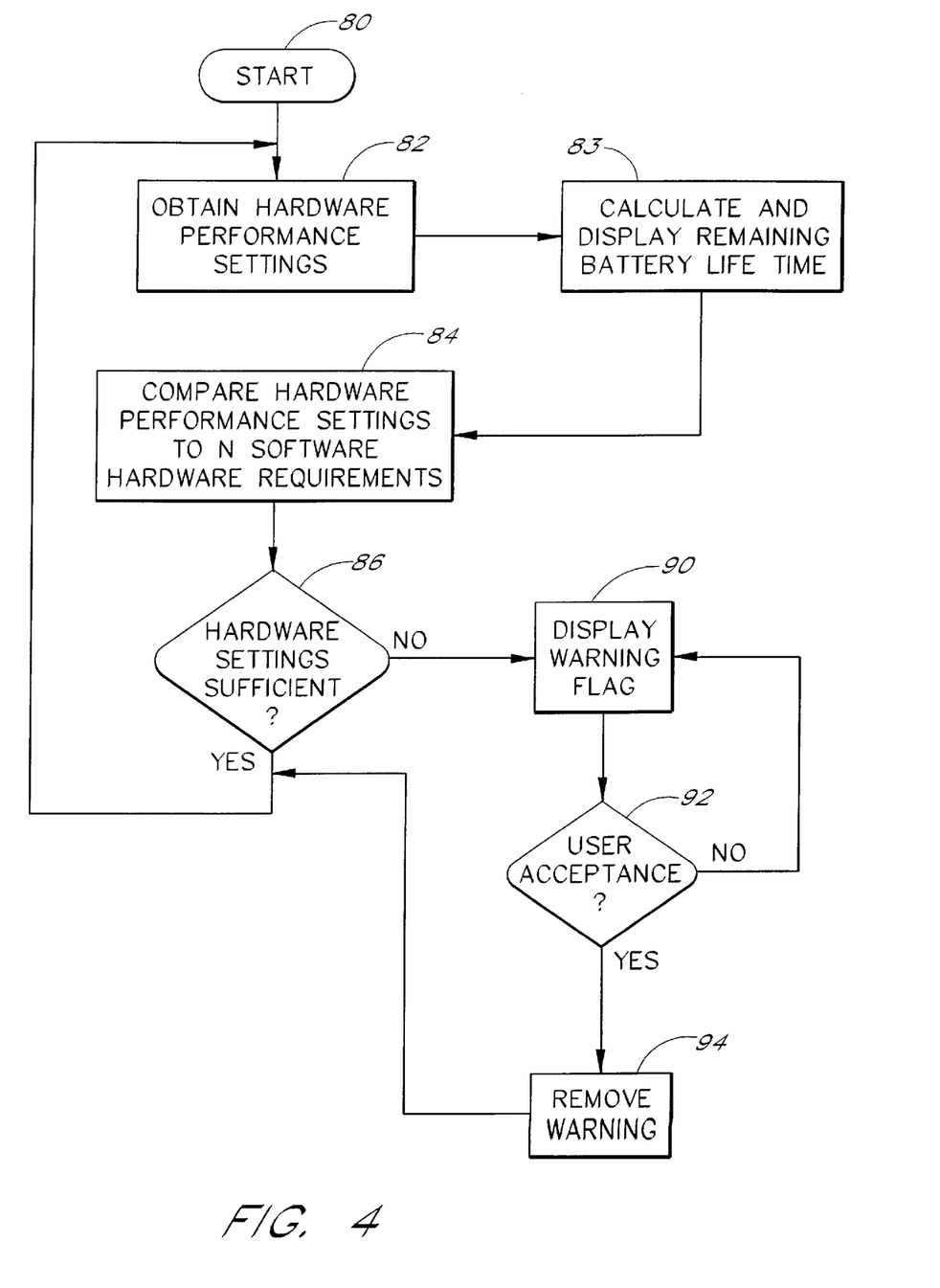
FIG. 4 is a flow diagram illustrating the processing tasks performed by the computer system of FIG. 2 while implementing the power control utility process.

FIG. 4 is an exemplary flow chart which illustrates one embodiment of the logical operation of the processor 32 while implementing the battery control process. In the preferred embodiment, when a user accesses the power management utility process 42 or adjusts the dials 52 on the visual interface 50, the processor 32 receives a signal and proceeds to a start state 80. The processor 32 then accesses, in state 82, the hardware performance settings on the dials 52 as set by the user in the previously described manner.

The processor 32 then calculates, in state 83, the remaining battery life using the new selected hardware parameters. Specifically, the processor 32 receives a signal from the battery 26 indicative of the current charge level and the processor 32 then calculates the drain per unit of time of battery power of the computer 20 at the current settings. This calculation is performed in a manner that is similar to the battery fuel gauge applications that are currently available. The processor 32 also induces the computer display 22 to display the remaining time that the battery may operate at the current settings. It will be appreciated that some of the drain values may be approximated, however, this calculation can be performed in any of a number of manners well known in the prior art.

The processor 32 then compares, in state 84, the actual hardware performance parameter settings to the particular desired performance parameters for each of the software applications of the computer 20. As discussed, the desired performance parameters are contained in the applications requirements data structure 40.

After comparing the actual hardware performance parameter settings to the desired performance parameters in state 84, the processor 32 determines, in decision state 86, whether the actual hardware parameter settings selected by the user are at or below the desired hardware parameters for any of the application programs currently loaded on the computer. It will be appreciated that, as used herein, a reference to an application "not running correctly" may vary in meaning. For instance, an application that runs slowly or does not perform at its full potential due to the hardware settings may be deemed by the user to not run correctly. Additionally, an application that will not run at all under the hardware settings also does not run correctly. The applications requirements data structure 40 may be set by a user such that the warning flags 70 will be triggered at various performance thresholds of the applications.

If any software applications will not run correctly under the current hardware settings, the processor 32 causes, in state 90, the display 22 to display the warning flag 70 (FIG. 3B) notifying the user which software applications will not run correctly under the current hardware settings. Once the warning flag is displayed in state 90, the processor 32 then determines, in decision state 92, whether the user has acknowledged the warning flag. The user may acknowledge the warning flag 70 in any wide variety of manners, such as by clicking on the warning flag with the mouse pointer. Alternatively, the user may acknowledge the warning flag by raising the hardware performance settings above the minimum hardware requirements for the applications on the computer 20. Once the user acknowledges the display warning flag 70, the processor 32 then removes the warning flag 70, in state 94. The processor then returns back to state 82 to await additional hardware settings by the user. The processor 32 performs the process shown in FIG. 4 until the user exits the process by, for example, using the mouse to close the Battery Power Management Utility process.

In another embodiment of the invention, a power management utility process 42*a* dynamically interacts with the application programs that the processor 32 is running. The power management utility process 42*a* optimizes application performance by setting the actual hardware performance parameters to the values of the desired hardware performance parameters corresponding to the running application program. Preferably, the power management utility process 42*a* continually monitors the application process 33 in order to determine which application is running. When the processor 32 runs an application, the power management utility process 42*a* accesses the requirements data structure 40 and determines the desired hardware performance parameters for the running software application. The power management utility process 42*a* then sets the actual hardware performance parameters to the desired performance parameters so that the application runs at the desired performance level. If multiple applications are currently running, the power management utility process 42*a* preferably sets the actual performance parameters equal to the maximum desired performance parameters of any of the plurality of running programs.

Figure 5:
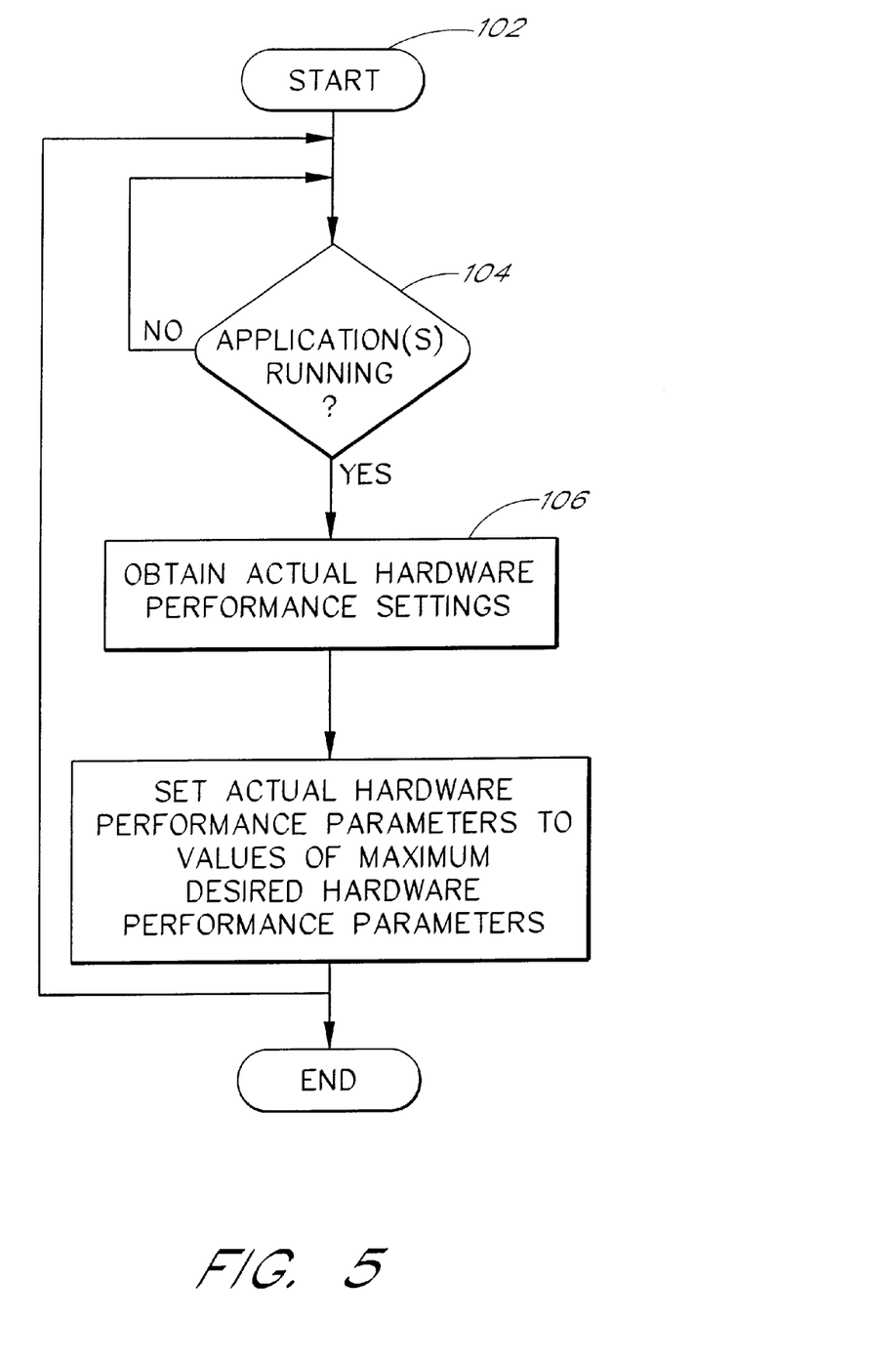
FIG. 5 is a flow diagram illustrating alternate processing tasks performed by the computer system of FIG. 2.

FIG. 5 is an exemplary flow chart which illustrates one embodiment of the logical operation of the processor 32 while implementing the power management utility process 42*a* described above. In this embodiment, the power management utility process 42 resides in memory 34 so that it may continually monitor whether the processor 32 runs any application programs. A user may load the power management utility process 32*a* into memory 34 in any wide variety of manners, such as, for example, by depressing a button 103 on the visual interface 50 (FIGS. 3*a* and 3*b*). The processor 32 receives a signal and then proceeds to a start state 102. The processor 32 then determines, in state 104, whether any application programs are currently running. If no applications are running, the processor waits a predetermined amount of time and then performs the check again.

As soon as it is determined that an application is running, the processor proceeds to state 106, where it accesses the applications requirement data structure 40. The processor 32 then determines the desired hardware performance parameters corresponding to the running application. If multiple applications are running, the processor 32 determines the desired hardware performance parameters for each of the running applications. The processor then proceeds to state 108 and sets the actual hardware performance parameters equal to the maximum desired performance parameters of any of the running applications. Preferably, the processor 32 continually performs the process illustrated in FIG. 5 until the user disables the process.

In this manner, the power management utility process 42a allows a user to configure the computer 20 so that the hardware parameters are automatically set such that applications perform at desired levels. This saves the user time by eliminating the need to reset the hardware parameters every time a new application is run on the computer 20.

There are a number of advantages associated with a computer incorporating this embodiment of a power management utility process 42 and 42a. The power management utility process 42 allows a user to adjust the actual hardware power settings to thereby increase or decrease consumption of battery power. The warning flags 70 advantageously assists a user in tailoring the actual hardware performance parameter settings to his or her particular needs with regards to software performance and the rate at which the computer consumes battery power. If a user is not concerned with the performance of software applications, but is rather interested in extending battery life, then the user may ignore the warning flags. However, should a user desire to maximize performance for a particular software application, then the user may use the power management utility in conjunction with the warning flags to ensure that the hardware performance settings are sufficient such that the applications will run correctly, but low enough such that the charge-life of the battery is maximized. Furthermore, the power management utility process 42a automatically sets the hardware parameters to desired levels every time an application is run.

Although the foregoing description of the invention has shown, described and pointed out the fundamental novel features of the invention, it will be understood that various omissions, substitutions, and changes, in the form of the detail of the apparatus as illustrated, as well as the uses thereof, may be made by those skilled in the art without departing from the spirit of the present invention. Consequently, the scope of the invention should not be limited to the foregoing discussion, but should be defined by the appended claims.

What is claimed is:

1. A method of managing power for a computer system having a processor, a display, a user input device, a memory, a computer component, at least one software application with an associated desired hardware performance criteria, and a limited power supply, comprising:

allowing a user to selectively set a hardware performance parameter of said computer system to adjust the power supplied to one or more components of said computer system;

comparing the actual hardware performance parameter set by said user to the desired hardware performance parameter associated with at least one software application; and generating a user notification if the actual hardware performance parameter is set below the desired hardware performance parameter.

2. The method of claim 1, additionally comprising:

determining the remaining life of said power supply when the computer system operates at said actual hardware performance parameter; and causing said display to display the remaining life of said power supply.

3. The method of claim 1, additionally comprising storing the desired performance hardware parameter in a data structure.

4. The method of claim 3, additionally comprising modifying the desired hardware performance parameter of the computer system.

5. The method of claim 1, wherein setting the actual hardware performance parameter comprises setting the brightness level of said display.

6. A method of managing power for a computer having a power source, a hardware component, and a user input device, comprising:

loading a program onto the computer;

setting an actual performance parameter of said hardware component at a first level in accordance with input received from a user;

determining whether said program operates below a desired performance level with said actual performance parameter at said first level; and permitting a user to adjust said actual performance parameter of said hardware component to a second level if said program operates below a desired performance level.

7. The method of claim 6, additionally comprising notifying a user if said program operates below a desired performance level.

8. The method of claim 6, wherein said hardware component is a display and setting an actual performance parameter comprises setting the brightness level of said display.

9. The method of claim 8, wherein adjusting said actual performance parameter comprises reducing the brightness level of said display.

10. The method of claim 6, wherein said hardware component is a processor and setting an actual performance parameter comprises setting the speed of said processor.

11. The method of claim 10, wherein adjusting said actual performance parameter comprises increasing the speed of said processor.

12. The method of claim 6, wherein said hardware component is a hard disk and setting an actual performance parameter comprises setting the access speed of said hard disk.

13. The method of claim 12, wherein adjusting said actual performance parameter comprises increasing the access speed of said hard disk.

14. The method of claim 6, additionally comprising determining said desired performance level and storing data corresponding to said desired performance level in a data structure.

15. A method of optimizing performance of a computer system powered by a power source, comprising:

loading a software program onto the computer system;

setting the rate at which the computer system consumes power from said power source according to input received from a user;

determining whether the software program will perform below a desired performance level at the set rate at which the computer system consumes power from said power source; and notifying the user if the software program will perform below the desired performance level.

16. The method of claim 15, wherein setting the rate at which the computer system consumes power comprises adjusting the performance level of a hardware component of the computer system.

17. The method of claim 16, wherein the hardware component is a processor and wherein setting the performance level of said hardware component comprises setting the speed of said processor.

18. The method of claim 16, wherein the hardware component is a hard disk and wherein setting the performance level of said hardware component comprises setting the access speed of said hard disk.

19. The method of claim 16, wherein the hardware component is a display and wherein setting the performance level of said hardware component comprises setting the brightness level of said display.

20. The method of claim 15, additionally comprising adjusting the rate at which the computer system consumes power from said power source if it is determined that the software program will perform below a desired performance level.

21. A method of optimizing software performance on a computer system having a hardware component and powered by a power source, comprising:
   storing a software program in a memory of the computer system;
   storing a data structure into said memory, said data structure containing desired performance parameters of said software program, said desired performance parameters corresponding to a desired performance level of said hardware component;
   allowing a user to selectively set an actual performance parameter corresponding to an actual performance level of said hardware component;
   comparing the actual performance parameter to the desired performance parameter; and
   permitting the user to adjust the actual performance parameter, if said actual performance parameter is below said desired performance parameter.

22. The method of claim 21, additionally comprising notifying a user if said actual performance parameter is below said desired performance parameter.

* * * * *